(12) United States Patent
Lee

(10) Patent No.: US 11,386,534 B2
(45) Date of Patent: *Jul. 12, 2022

(54) NOISE ENHANCED HISTOGRAMS

(71) Applicant: Imagination Technologies Limited, Kings Langley (GB)

(72) Inventor: Tim Lee, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/939,488

(22) Filed: Jul. 27, 2020

(65) Prior Publication Data
US 2020/0357101 A1 Nov. 12, 2020

Related U.S. Application Data

(63) Continuation of application No. 15/628,877, filed on Jun. 21, 2017, now Pat. No. 10,748,262, which is a continuation of application No. 14/701,771, filed on May 1, 2015, now Pat. No. 9,697,594.

(30) Foreign Application Priority Data

May 1, 2014 (GB) .................................. 1407687

(51) Int. Cl.
*G06T 5/40* (2006.01)
*G06T 5/00* (2006.01)
*H04N 5/235* (2006.01)

(52) U.S. Cl.
CPC ................ *G06T 5/40* (2013.01); *G06T 5/002* (2013.01); *G06T 5/009* (2013.01); *H04N 5/2351* (2013.01)

(58) Field of Classification Search
CPC ........... G06T 5/002; G06T 5/009; G06T 5/40; H04N 5/2351
See application file for complete search history.

(56) References Cited

U.S. PATENT DOCUMENTS

| 5,381,180 A | 1/1995 | Keith |
| 6,687,400 B1 | 2/2004 | Szeliski |
| 6,747,660 B1 | 6/2004 | Olano et al. |

(Continued)

FOREIGN PATENT DOCUMENTS

| EP | 1094420 A2 | 4/2001 |
| WO | 2009126461 A2 | 10/2009 |

OTHER PUBLICATIONS

Bigelow "Posterization", Jun. 18, 2006 (Jun. 18, 2006), XP055213680, Retrieved from the Internet: URL:http://web.archive.org/web/20060618155343/http://www.ronbigelow.com/articles/posterization/posterization.htm.

*Primary Examiner* — Phuoc Tran
(74) *Attorney, Agent, or Firm* — Potomac Law Group, PLLC; Vincent M DeLuca

(57) ABSTRACT

Apparatus for binning an input value into one of a plurality of bins which collectively represent a histogram of input values, each of the plurality of bins representing a corresponding range of input values, the apparatus comprising: an input for receiving an input value; a noise source configured to generate an error value according to a predetermined noise distribution; and a binning controller configured to mix the received input value with the error value so as to generate a modified input value and to allocate the modified input value to the bin corresponding to that modified input value.

19 Claims, 2 Drawing Sheets

(56) References Cited

U.S. PATENT DOCUMENTS

| | | |
|---|---|---|
| 9,113,089 B2* | 8/2015 | Zhang .................. H04N 5/2355 |
| 9,697,594 B2 | 7/2017 | Lee |
| 10,748,262 B2* | 8/2020 | Lee .......................... G06T 5/40 |
| 2005/0057666 A1 | 3/2005 | Hu et al. |
| 2007/0136027 A1 | 6/2007 | Dwork et al. |
| 2007/0154089 A1 | 7/2007 | Kao |
| 2008/0055432 A1 | 3/2008 | Koseki |
| 2008/0158430 A1 | 7/2008 | Hu |
| 2009/0102963 A1 | 4/2009 | Yeo et al. |
| 2009/0257672 A1 | 10/2009 | Sullender |
| 2012/0050492 A1 | 3/2012 | Moriwake |
| 2012/0257063 A1* | 10/2012 | Moriwake .............. H04N 13/15 348/159 |
| 2013/0329093 A1 | 12/2013 | Zhang et al. |

\* cited by examiner

NOISE ENHANCED HISTOGRAMS

BACKGROUND OF THE INVENTION

This invention relates to binning apparatus for generating a histogram of input values of data relating to physical phenomena such as parameters of imaging devices, and to a method for binning input values so as to generate such a histogram.

The processing pipelines of digital cameras frequently make use of histograms to summarise the frequency distribution of parameters, such as exposure parameters, captured by the pixels of the camera sensor. A histogram divides the range of possible input values of a parameter into a series of bins, with each bin representing a count of the number of pixels having a parameter falling within the respective range of that bin. Such histograms can be used by the image processing algorithms of the pipeline in order to perform control functions of the camera such as auto-exposure, auto-focus and auto-white balance. A camera sensor will generally include many millions of pixels and the use of such histograms helps to provide a summary of the characteristics of a captured frame at a level of detail which is appropriate and manageable by pipeline algorithms.

A problem is encountered with the use of conventional binning controllers in digital cameras to generate such histograms, especially when the frequency distribution of the frame parameter exhibits sharp changes in value. For example, in the case where the parameter is a measure of exposure, this can be seen when a large number of pixels all indicate exposure parameters lying within a narrow range. FIG. 3 illustrates such a clustering of exposure parameters, which presents as a sharp spike 303 in the frequency distribution of exposure parameters reported by the pixels of the frame (only part of that distribution is illustrated in the figure). In practice, this might be observed when, for example, a camera captures a frame that includes a large area of brightly-lit white wall (such as behind a person who is having their portrait taken). Such a frame would exhibit a spike in the frequency distribution at a high exposure corresponding to the bright white areas of the captured frame.

In FIG. 3, bins 301 and 302 are adjacent bins forming part of a histogram generated from the frequency distribution of the captured exposure parameters. The frequency distribution can represent the frequency of occurrence of captured exposure parameters in a given sample (a sample being, for example, a set of captured exposure parameters belonging to a frame captured by a camera sensor). A frequency distribution can be represented by a table having entries for each of a set of intervals which collectively span the range of possible values of the captured exposure parameters, each entry in the table holding a count of the number of occurrences of captured exposure parameters which have values that lie within the respective interval.

It can be seen in FIG. 3 that the width of the spike 303 is narrower than the width of adjacent bins 301 and 302 of the histogram. In forming the histogram, all of the exposure parameters lying within the range of bin 301 (to the right side of line 304) would be allocated to bin 301, and all of the exposure parameters lying within the range of bin 302 (to the left side of line 304) would be allocated to bin 302. Bin 302, in which the peak of the spike lies, therefore receives a significantly higher contribution than bin 301.

However, as each consecutive frame is captured by the camera and the light incident at the sensor changes (e.g. due to repositioning of the camera or changes in the captured scene), the spike is likely to shift slightly from one frame to the next whilst the auto-exposure algorithms are looking to optimize the exposure of the frame to be captured. As can be appreciated from FIG. 3, only a small shift in the position of spike 303 is required to move it from bin 302 into bin 301. Roughly speaking, this would cause the peak in the histogram to move from bin 302 to bin 301, substantially changing the profile of the histogram. Small shifts in the position of a spike in the frequency distribution of an exposure parameter can in other words be amplified, leading to large changes in the histogram and consequent changes e.g. to the decisions made by the auto-exposure control function of the digital camera.

For example, consider the case in which the spike 303 shifts by a small amount from bin 302 to 301. The value of each bin of a histogram is typically taken to be the mean value of that bin (e.g. central values 305 and 306 in FIG. 3). The value of the peak initially represented by bin 302 prior to the shift in the spike 303 therefore takes a value of 306, but following the shift in the spike 303 the peak appears to occur at the value 305, which is the mean value of bin 301. Movements of the spike 303 of significantly less than the width of a bin can therefore lead to a step change in the apparent location of a peak (as indicated by the histogram) equal to the width of a bin.

A particular manifestation of this problem is that when a spike in an exposure parameter occurs close to the boundary between the bins of a histogram, the auto-exposure (AE) control function of the digital camera can end up oscillating between states. For example, the AE function might select a first mode when the histogram generated by a conventional binning controller appears to show a peak at bin 302. In response, the AE function could adapt control parameters such as shutter speed and sensitivity which in turn might cause the spike 303 to shift slightly in the manner described above and hence result in the histogram showing a peak at bin 301. The auto-exposure algorithm would in response then select a second mode and adapt the control parameters in a different way, shifting the underlying spike 303 back into bin 302. In this manner, conventional binning controllers can suffer from feedback issues which cause the control algorithms of digital cameras to oscillate between modes even in the absence of environmental changes such as changes in light levels in the captured scene. This can lead to sub-optimal camera performance and excessive power consumption by the device.

Such problems with conventional binning controllers are typically addressed by introducing a greater number of bins. However, this has the effect of significantly increasing the resources required by the binning apparatus because the complexity of the binning controller is increased, the resources consumed by the bins is increased, and the complexity of control algorithms using the histogram output of the binning controller is increased.

BRIEF SUMMARY OF THE INVENTION

According to a first aspect of the present invention there is provided apparatus for binning an input value into one of a plurality of bins which collectively represent a histogram of input values, each of the plurality of bins representing a corresponding range of input values, the apparatus comprising:

an input for receiving an input value;
a noise source configured to generate an error value according to a predetermined noise distribution; and a binning controller configured to mix the received input value with the error value so as to generate a modified input value and to allocate the modified input value to the bin corresponding to that modified input value.

The noise source may be configured to generate the error value by selecting the error value from a pseudorandom sequence of error values which collectively represent the predetermined noise distribution.

The binning controller may be configured to combine each input value it receives for binning with a new error value from the pseudorandom sequence.

Each of the plurality of bins may be a counter maintained by the binning controller, wherein the binning controller is configured to increment the count value of a counter when a modified input value is allocated to the counter.

The plurality of bins may collectively spanning the possible range of input values.

The noise distribution may be symmetric about zero.

The predetermined noise distribution may have a variance which is approximately equal to the width of each bin.

The noise distribution may be one of a Gaussian distribution, a triangular distribution, or a rectangular distribution.

The apparatus may be provided at an image processing pipeline so as to generate the histogram for use by one or more image processing algorithms.

The image processing pipeline may be an image processing pipeline of a camera and the image processing algorithms being one or more of an automatic exposure algorithm, an automatic white balance algorithm, and an autofocus algorithm.

The input values may representing one or more of exposure, brightness, sharpness, contrast, hue, saturation, lightness, chroma, and colourfulness.

Machine readable code can be provided for generating the apparatus. A machine readable storage medium having encoded thereon non-transitory machine readable code can be provided for generating the apparatus.

According to a second aspect of the present invention there is provided a method for generating a histogram of input values, the histogram comprising a plurality of bins each representing a corresponding range of input values, the method comprising:
  receiving an input value;
  generating an error value according to a predetermined noise distribution;
  mixing the received input value with the error value so as to generate a modified input value; and
  allocating the modified input value to the bin corresponding to that modified input value.

Each of the plurality of bins of the histogram may be a counter and the method comprising allocating the modified input value to the bin by incrementing the count value of its counter.

The predetermined noise distribution may have a variance which is approximately equal to the width of each bin.

Machine readable code can be provided for implementing the method for generating a histogram of input values. A machine readable storage medium having encoded thereon non-transitory machine readable code can be provided for implementing the method for generating a histogram of input values.

BRIEF DESCRIPTION OF THE DRAWINGS

The present invention will now be described by way of example with reference to the accompanying drawings. In the drawings.

DETAILED DESCRIPTION

The following description is presented by way of example to enable any person skilled in the art to make and use the invention. The present invention is not limited to the embodiments described herein and various modifications to the disclosed embodiments will be readily apparent to those skilled in the art.

It would be useful to have an improved binning controller which addresses the problems identified above. As described in the examples below, noise can be mixed with the input values before a binning process is performed, and this can improve the resulting histogram. It may be considered surprising that introducing noise into the input values can improve the histogram.

Figure 1:
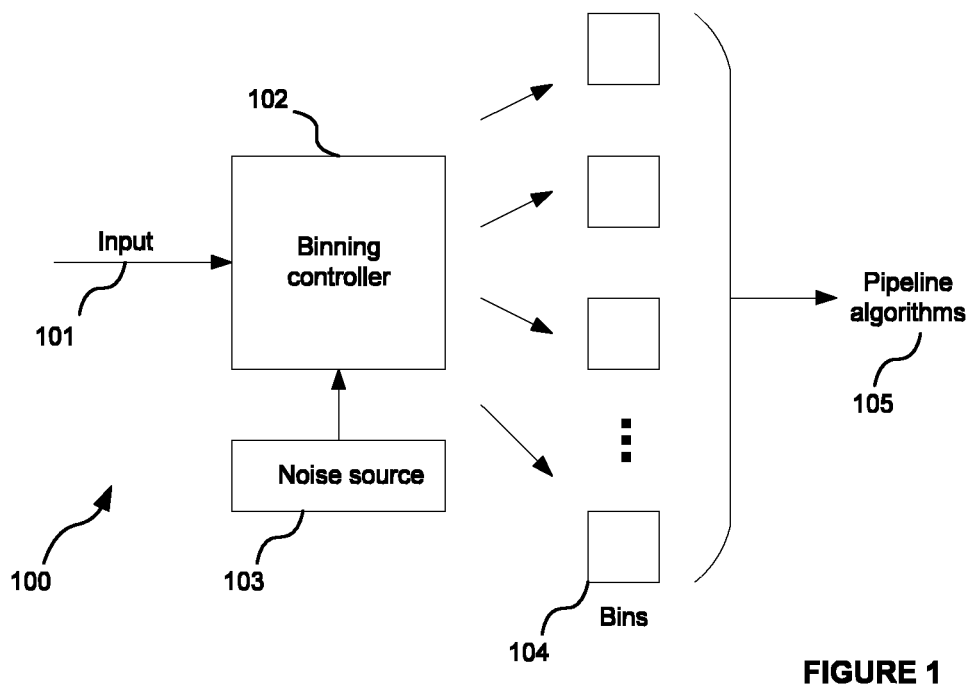
FIG. 1 is a schematic diagram of binning apparatus configured in accordance with the principles described herein.

FIG. 1 is a schematic diagram illustrating binning apparatus 100 configured according to the principles described herein. Binning apparatus 100 comprises a binning controller 102 having an input 101 for receiving input values from a data source, such as but not limited to an imaging device. Binning controller 102 is configured to, in the manner described below, allocate input values to a set of bins 104 so as to generate a histogram indicating the frequency distribution of the input values. Each bin can be a counter which is maintained by the binning controller 102. In this case, the binning controller 102 is configured to increment the count value of a counter by some predetermined value (e.g. one) each time an input value is allocated to that bin such that a summary of the frequency distribution of the input values is formed. Such a histogram is useful in providing a construct of the input values at a level of detail which is suitable for use in pipeline algorithms 105 that perform one or more control or calibration functions at a device at which binning apparatus 100 is provided.

The input values can be any kind of values in respect of which a histogram is to be formed. In the examples described herein, the input values are input values for a camera pipeline at which the binning controller is supported, and the histogram represented by the set of bins 104 is used in image processing algorithms 105 in operation at the camera pipeline. The binning controller can be configured to bin all of the input values associated with a captured frame so as to form a histogram representing the frequency distribution of those input values for that frame. For example, there could be a respective input value for each of the pixels of a captured frame. By running the binning controller on a sequence of frames captured by a camera pipeline, a series of histograms can be generated summarising the evolution of the frequency distribution of the input values.

The operation of the binning controller will now be described by way of an example in which the input values are a measure of exposure in a captured frame and the histogram represented by the set of bins 104 is used in an automatic exposure algorithm 105 of a camera pipeline.

Figure 4:
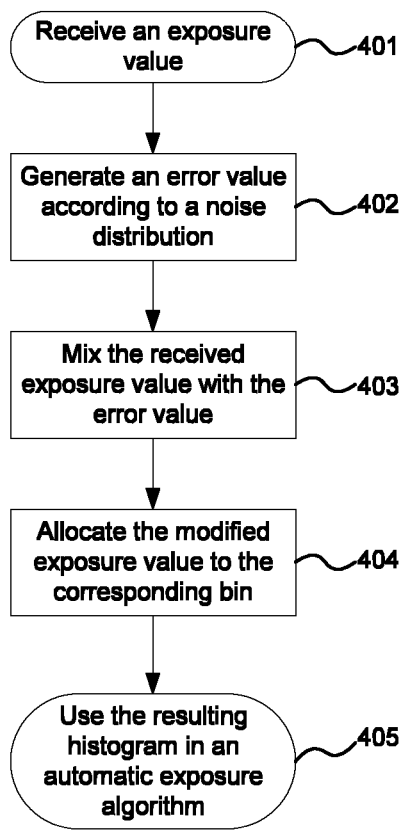
FIG. 4 is a flowchart illustrating a method of generating a histogram according to the principles described herein.

FIG. 4 is a flowchart illustrating the operation of the binning controller on received input values 401 according to this example.

Figure 2:
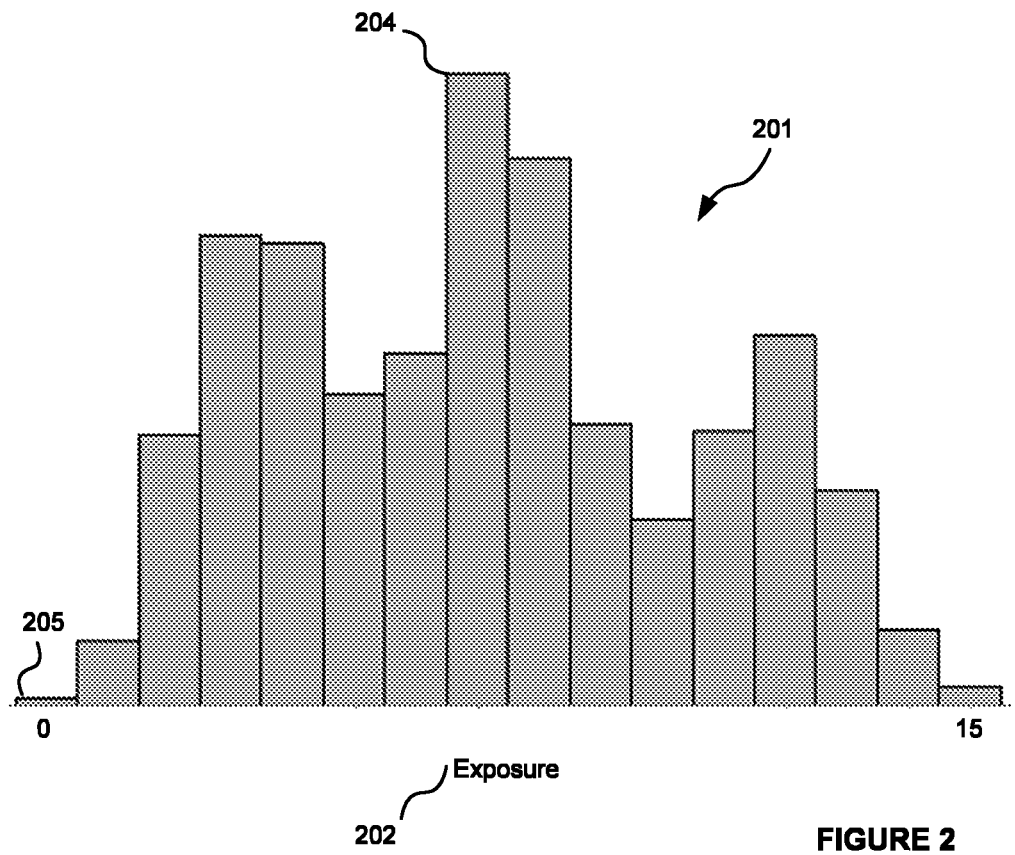
FIG. 2 shows a histogram representing the frequency distribution of exposure values occurring in a frame.
Figure 3:
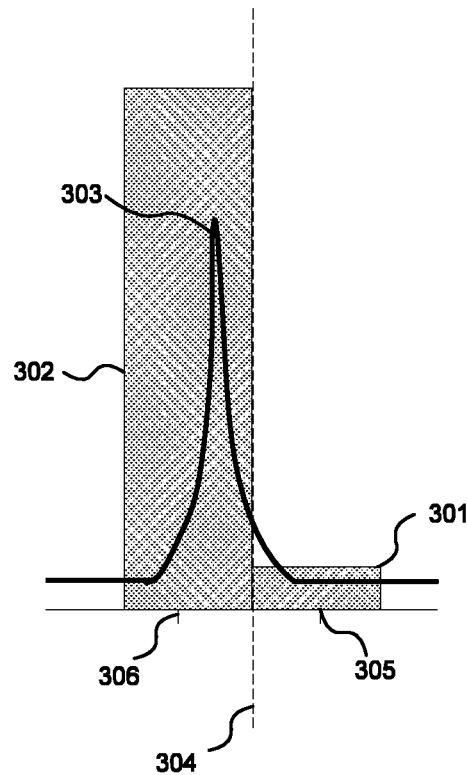
FIG. 3 illustrates a mapping between histogram values and a spike in the underlying frequency distribution of an input value for a camera pipeline.

FIG. 2 shows a histogram 201 illustrating the frequency distribution of exposure values 202 for a frame captured by a digital camera comprising the binning controller 102. The exposure values could be any suitable measure of exposure and in this example represent input values for the binning controller 102. In the example shown in FIG. 2, the exposure values have been binned into 16 bins ranging from bin 0 (low exposure) to bin 15 (high exposure), with each bin representing the prevalence in the frame of exposure values within the respective range of input values of the bin. For instance, the possible range of exposure values might lie between 0 and 255 on some predetermined scale, with each bin representing $1116^{th}$ of that scale such that exposure values between 0 and 15 are allocated to bin 0, exposure values between 16 and 31 are allocated to bin 1, etc. The histogram collectively formed by the bins is therefore an approximate representation of the frequency distribution of the exposure value.

Typically a camera sensor will have a very large number of pixels each able to provide light intensity information from which a measure of exposure (e.g. an exposure value) can be determined. For example, a 5 megapixel camera sensor will have around 5 million pixels each providing light intensity information (typically from a collection of one or more subpixels each adapted to detect a component colour red, green or blue). This represents a large number of input values from which histogram 201 can be formed. As appropriate to the underlying architecture of the sensor and camera pipeline, exposure input values determined in respect of each pixel, or groups of two or more pixels can be binned into the bins of the histogram 201 by the binning controller.

Each exposure value could, for example, be proportional to the intensity of light incident at a pixel of the camera sensor over a given period of time (e.g. the exposure time). High bin values (such as the tall column indicated by 204 in FIG. 2) denote a large number of pixels having an exposure value falling within the respective range, and low bin values (such as the small column indicated by 205 in FIG. 2) denote a small number of pixels having an exposure value falling within the respective range.

Returning to FIG. 1, binning controller 102 is configured to mix input values 101 with a source of noise 103 prior to binning the input values in bins 104. For example, at step 403 in FIG. 4 the binning controller can be configured to add error values it receives from the noise source to exposure values it receives from input 101. It is noted that different error values are added to different input values. This has the effect of spreading out sharp spikes in the frequency distribution of input values and ensuring that the resulting histogram better reflects the underlying frequency distribution. In this way, the situation of small shifts in the position of a spike in the frequency distribution of the input values causing unduly large changes in the histogram can be avoided. By choosing a noise source which is random (or, in a practical implementation, pseudorandom), symmetric with a mean value of zero, and independent of the input values themselves, the introduction of systematic bias can be avoided. As described above, the error values from the noise source 103 are added to the input values before the binning process, thereby generating modified input values. The binning controller 102 allocates the modified input values to the bins—e.g. by allocating each modified exposure value to the corresponding bin as indicated by step 404 in FIG. 4.

It is advantageous if the noise source 103 is configured so as to provide noise having a distribution with a variance approximately equal to the width of the bins 104. For example, the noise source can be configured to provide noise with a distribution having a variance within 5, 10, 15, 20, 25, 30 or 35% of the width of the bins. For a histogram having bins varying in width over the range of input values, it can be advantageous to take the width of the bins to be the average width of the bins (e.g. the mean width), or the width of the largest bin. This helps to ensure that performance is optimised over the full range of the histogram.

Configuring the variance of the noise source to be approximately equal to width of the bins of the histogram provides a good balance between introducing sufficient noise to achieve the aim of improving the histogram representation of the frequency distribution of input values, whilst minimising the error caused by the introduction of the noise and hence minimising any possible concomitant loss of accuracy introduced into the input values so as to avoid degrading the performance of the camera pipeline. The noise source 103 generates error values for combination with the input values prior to the binning of the resulting value into the bins 104. For example, noise source 103 can generate a pseudorandom sequence of numbers for use by the binning controller. To maintain good noise characteristics, binning controller 102 is preferably configured to combine a new error value from the pseudorandom sequence (e.g. the next error value in the sequence) with each input value it receives for binning.

Noise generated by the noise source 103 (as indicated by step 402 in FIG. 4) could have any kind of symmetrical distribution centred on zero (i.e. so as to not introduce bias into the input values). For example, the noise could have a Gaussian, triangular or rectangular distribution. In general the noise source 103 is configured to generate error values according to a predetermined noise distribution. As described above, the error values may be generated by selecting the error value from a pseudorandom sequence of error values which collectively represent the predetermined noise distribution.

With the same number of bins, binning apparatus 100 can provide improved performance over conventional binning apparatus. Similarly, binning apparatus 100 can provide an equivalent level of performance to conventional binning apparatus that uses a larger number of bins and has significantly higher resource requirements. Efficient noise sources that offer high performance and low resource requirements are well known for both software and hardware environments. For example, a linear feedback shift register (LFSR) or a Galois LFSR can offer good performance at a low computational overhead.

In the above-described example, binning apparatus 100 is configured to perform binning of exposure values so as to form a histogram for use by the auto-exposure algorithms of a camera pipeline, as indicated by step 405 of FIG. 4. Suitable input values for representing exposure include measures of exposure, intensity and brightness. Equivalent binning apparatus can be used to perform the binning of values representing measures of sharpness and/or contrast in an image so as to generate a histogram for use by the auto-focus algorithms of a camera pipeline. Equivalent binning apparatus can be used to perform the binning of values representing measures of hue, lightness, saturation, chroma and/or colourfulness in an image so as to generate a histogram for use by the auto-white balance algorithms of a camera pipeline. The binning apparatus is not restricted to being implemented at a camera pipeline and more generally could be provided at any kind of device in which input values of any kind of input values are to be binned so as to form a histogram. The pipeline algorithms 105 could be any kind of algorithms which make use of the binned values of the histogram.

The binning apparatus of FIG. 1 is shown as comprising a number of functional blocks. This is for illustrative purposes only and is not intended to define a strict division between different parts of hardware on a chip or between different programs, procedures or functions in software. The term logic as used herein can refer to any kind of software, hardware, or combination of hardware and software.

Binning apparatus configured in accordance with the present invention could be embodied in hardware, software or any suitable combination of hardware and software. Binning apparatus of the present invention could comprise, for example, software for execution at one or more processors (such as at a CPU and/or GPU), and/or one or more dedicated processors (such as ASICs), and/or one or more programmable processors (such as FPGAs) suitably programmed so as to provide functionalities of the data processing device, and/or heterogeneous processors comprising one or more dedicated, programmable and general purpose processing functionalities. In preferred embodiments of the present invention, the binning apparatus comprises one or more processors and one or more memories having program code stored thereon, the data processors and the memories being such as to, in combination, provide the claimed binning apparatus and/or perform the claimed methods.

The terms software and computer readable program code as used herein includes executable code for processors (e.g. CPUs and/or GPUs), firmware, bytecode, programming language code such as C or OpenCL (RTM), and modules for reconfigurable logic devices such as FPGAs. Machine-readable code includes software and code for defining hardware representations of integrated circuits at any level, including at register transfer level (RTL), at high-level circuit representations such as Verilog or VHDL, and lower-level representations such as OASIS (RTM) and GDSII.

Any one or more of the algorithms and methods described herein could be performed by one or more physical processing units executing program code that causes the unit(s) to perform the algorithms/methods. The or each physical processing unit could be any suitable processor, such as a CPU or GPU (or a core thereof), or fixed function or programmable hardware. The program code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. Apparatus for binning an input value into one of a plurality of bins for use by one or more processing algorithms, each of the plurality of bins representing at least one corresponding value, the apparatus comprising:
 a binning controller configured to mix an input value with an error value so as to generate a modified input value and to allocate the modified input value to the bin corresponding to that modified input value, wherein the error value is generated according to a predetermined noise distribution having a variance which is substantially equal to the average width of the bins or the width of the largest bin.

2. Apparatus as claimed in claim 1, wherein the input value is a value of data representative of a physical parameter.

3. Apparatus as claimed in claim 2, wherein the input value is a value of data representative of a parameter of an imaging device.

4. Apparatus as claimed in claim 1, wherein the input value is for a camera pipeline.

5. Apparatus as claimed in claim 1, wherein the apparatus is provided at a device, and wherein said one or more processing algorithms perform one or more control or calibration functions at the device.

6. Apparatus as claimed in claim 1, wherein the apparatus is provided at an imaging device.

7. Apparatus as claimed in claim 6, wherein the input value is associated with a captured frame, and the distribution of input values for that captured frame is represented by a histogram.

8. The apparatus of claim 1 wherein the apparatus is provided at an image processing pipeline, and wherein said one or more processing algorithms are one or more image processing algorithms.

9. Apparatus as claimed in claim 8, the image processing pipeline being an image processing pipeline of a camera and the image processing algorithms being at least one of an automatic exposure algorithm, an automatic white balance algorithm, and an autofocus algorithm.

10. The apparatus of claim 1, wherein the apparatus further comprises an input for receiving the input value.

11. The apparatus of claim 1, wherein the apparatus further comprises a noise source configured to generate the error value according to the predetermined noise distribution.

12. Apparatus as claimed in claim 1, wherein the predetermined noise distribution has a variance within 5, 10, 15, 20, 25, 30 or 35% of the average width of the bins or the width of the largest bin.

13. Apparatus as claimed in claim 11, the noise source being configured to generate the error value by selecting the error value from a pseudorandom sequence of error values which collectively represent the predetermined noise distribution.

14. Apparatus as claimed in claim 13, the binning controller being configured to combine each input value it receives for binning with a new error value from the pseudorandom sequence.

15. Apparatus as claimed in claim 1, wherein the plurality of bins collectively represent a histogram of values.

16. Apparatus as claimed in claim 1, wherein each of the plurality of bins represents a corresponding range of input values.

17. A non-transitory machine-readable storage medium having encoded thereon machine-readable code which when executed causes the generation of an apparatus for binning an input value into one of a plurality of bins for use by one or more processing algorithms, each of the plurality of bins representing at least one corresponding value, the apparatus comprising:

a binning controller configured to mix an input value with an error value so as to generate a modified input value and to allocate the modified input value to the bin corresponding to that modified input value, wherein the error value is generated according to a predetermined noise distribution having a variance which is substantially equal to the average width of the bins or the width of the largest bin.

18. A method for binning an input value into one of a plurality of bins for use by one or more processing algorithms, each of the plurality of bins representing at least one corresponding value, the method comprising:

mixing an input value with an error value so as to generate a modified input value; and allocating the modified input value to the bin corresponding to that modified input value;

wherein the error value is generated according to a predetermined noise distribution having a variance which is substantially equal to the average width of the bins or the width of the largest bin.

19. A non-transitory machine-readable storage medium having encoded thereon machine-readable code which when executed causes the implementation of the method for binning an input value into one of a plurality of bins as set forth in claim 18.

* * * * *